US011568856B2

(12) United States Patent
Ho et al.

(10) Patent No.: US 11,568,856 B2
(45) Date of Patent: *Jan. 31, 2023

(54) INTENT AUTHORING USING WEAK SUPERVISION AND CO-TRAINING FOR AUTOMATED RESPONSE SYSTEMS

(71) Applicant: INTERNATIONAL BUSINESS MACHINES CORPORATION, Armonk, NY (US)

(72) Inventors: Tin Kam Ho, Milburn, NJ (US); Robert L. Yates, Arlington, MA (US); Blake McGregor, Foster City, CA (US); Rajendra G. Ugrani, Union City, NJ (US); Neil R. Mallinar, Long Island City, NY (US); Abhishek Shah, Jersey City, NJ (US); Ayush Gupta, Morrisville, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 213 days.

This patent is subject to a terminal disclaimer.

(21) Appl. No.: 16/949,232

(22) Filed: Oct. 21, 2020

(65) Prior Publication Data
US 2021/0035557 A1 Feb. 4, 2021

Related U.S. Application Data

(63) Continuation of application No. 16/119,849, filed on Aug. 31, 2018, now Pat. No. 10,832,659.

(51) Int. Cl.
*G10L 15/00* (2013.01)
*G10L 15/06* (2013.01)
(Continued)

(52) U.S. Cl.
CPC ........ *G10L 15/063* (2013.01); *G10L 15/1815* (2013.01); *G10L 15/22* (2013.01); *G10L 2015/0638* (2013.01); *G10L 2015/223* (2013.01)

(58) Field of Classification Search
None
See application file for complete search history.

(56) References Cited

U.S. PATENT DOCUMENTS 8,069,042 B2   11/2011   Joublin et al.
8,515,736 B1   8/2013    Duta
(Continued)

FOREIGN PATENT DOCUMENTS

WO   2017156640 A1   9/2017

OTHER PUBLICATIONS

Rapidly scaling dialog systems with interactive learning Williams, Niraula, Dasigi, et al. Work done while at Microsoft Research, Jan. 2015 (12 Pages).

(Continued)

*Primary Examiner* — Satwant K Singh
(74) *Attorney, Agent, or Firm* — Griffiths & Seaton PLLC (57) ABSTRACT

A combination of propagation operations and learning algorithms is applied, using a selected set of labeled conversational logs retrieved from a subset of a plurality of conversational logs, to a remaining corpus of the plurality of conversational logs to train an automated response system according to an intent associated with each of the conversational logs. The combination of propagation operations and learning algorithms may include defining the labels by a user for the selected set of the subset of the plurality of conversational logs; training a probabilistic classifier using the defined labels of features of the selected set, wherein the probabilistic classifier produces labeling decisions for the (Continued)

subset of conversational logs; weighting the features of the selected set in a model optimization process; and/or training an additional classifier using the weighted features of the selected set and applying the additional classifier to the remaining corpus.

21 Claims, 9 Drawing Sheets

(51) Int. Cl.
*G10L 15/18* (2013.01)
*G10L 15/22* (2006.01)

(56) References Cited

U.S. PATENT DOCUMENTS

| | | | |
|---|---|---|---|
| 8,554,715 | B2 | 10/2013 | Kraaij et al. |
| 8,571,869 | B2 | 10/2013 | Deligne et al. |
| 9,196,245 | B2 | 11/2015 | Larcheveque et al. |
| 9,292,262 | B2 | 3/2016 | Gabel et al. |
| 9,436,759 | B2 | 9/2016 | Huang et al. |
| 9,589,564 | B2 | 3/2017 | Sharif |
| 9,842,000 | B2 | 12/2017 | Bishop et al. |
| 10,102,846 | B2 | 10/2018 | Braz et al. |
| 10,395,648 | B1 | 8/2019 | Benkreira et al. |
| 10,515,630 | B1 | 12/2019 | Benkreira et al. |
| 10,657,166 | B2 | 5/2020 | Gorzela et al. |
| 10,726,827 | B2 | 7/2020 | Braz et al. |
| 10,789,943 | B1 | 9/2020 | Lapshina et al. |
| 10,832,659 | B2 * | 11/2020 | Ho .......................... G06F 40/30 |
| 2003/0200172 | A1 | 10/2003 | Randle et al. |
| 2010/0306249 | A1 | 12/2010 | Hill et al. |
| 2015/0221305 | A1 | 8/2015 | Sharifi |
| 2015/0279360 | A1 | 10/2015 | Mengibar et al. |
| 2016/0055240 | A1 | 2/2016 | Tur et al. |
| 2017/0235740 | A1 | 8/2017 | Seth et al. |
| 2017/0242886 | A1 | 8/2017 | Jolley et al. |
| 2017/0278514 | A1 | 9/2017 | Mathias et al. |
| 2017/0330077 | A1 | 11/2017 | Williams et al. |
| 2018/0053119 | A1 | 2/2018 | Zeng et al. |
| 2018/0068019 | A1 | 3/2018 | Novikoff et al. |
| 2018/0096058 | A1 | 4/2018 | Anderson et al. |
| 2018/0137401 | A1 | 5/2018 | Kumar et al. |
| 2018/0358001 | A1 | 12/2018 | Amid et al. |
| 2019/0051290 | A1 | 2/2019 | Li et al. |
| 2019/0166069 | A1 | 5/2019 | Yao et al. |
| 2019/0166403 | A1 | 5/2019 | Yelton et al. |
| 2019/0286712 | A1 | 9/2019 | Terry et al. |
| 2020/0007380 | A1 | 1/2020 | Chen et al. |
| 2020/0065384 | A1 | 2/2020 | Costello |
| 2020/0066255 | A1 | 2/2020 | Madan et al. |
| 2020/0074984 | A1 | 3/2020 | Ho et al. |
| 2020/0167417 | A1 | 5/2020 | Li et al. |
| 2020/0202256 | A1 | 6/2020 | Chaudhari et al. |
| 2020/0219494 | A1 | 7/2020 | Dhoolia et al. |
| 2020/0236068 | A1 | 7/2020 | Tenyenhuis et al. |
| 2020/0242305 | A1 | 7/2020 | Wu |
| 2020/0250277 | A1 | 8/2020 | Mallette et al. |
| 2020/0251100 | A1 | 8/2020 | Tan et al. |
| 2020/0335097 | A1 * | 10/2020 | Seol .................. G10L 15/1822 |
| 2020/0349919 | A1 | 11/2020 | Wanas et al. |

OTHER PUBLICATIONS

"Bootstrapping Conversational Agents With Weak Supervision", Neil Mallinar et al. IBM Watson, New York, NY 10003, USA (6 Pages).

"Complexity Measures of Supervised Classification Problems", Tin Kam Ho, Member, IEEE, and Mitra Basu, Senior Member, IEEE Transactions of Pattern Analysis and Machine Intelligence, vol. 24, No. 3, Mar. 2002 (12 Pages).

"Iterative app design for LUIS" https://docs.microsoft.com/en-us/azure/cognitive-services/luis/luis-concept-app-iterationJul. 6, 2020 (7 Pages).

Anuj Goyal, Angeliki Metallinou, Spyros Matsoukas, "Fast and Scalable Expansion of Natural Language Understanding Functionality for Intelligent Agents," Proceedings of NAACL-HLT 2018, pp. 145-152.

Alexander Ratner, Christopher De Sa, Sen Wu, Daniel Selsam, Christopher Ré, "Data Programming: Creating Large Training Sets, Quickly," NIPS 2016.

List of IBM Patents or Patent Applications Treated as Related (2 Pages).

Williams J.D. et al., Rapidly Scaling Dialog Systems with Interactive Learning. In: Lee G., Kim H., Jeong M., Kim JH. (eds) Natural Language Dialog Systems and Intelligent Assistants. Springer, Cham, 2015.

* cited by examiner

INTENT AUTHORING USING WEAK SUPERVISION AND CO-TRAINING FOR AUTOMATED RESPONSE SYSTEMS

BACKGROUND OF THE INVENTION

Field of the Invention

The present invention relates in general to computing systems, and more particularly, to various embodiments for training automated response systems with intent data from a repository of existing conversational logs.

Description of the Related Art

Customer contact center systems provide support for customers of a particular product or service by allowing those users to make requests for service that can include a question posed by the user related to the product or service. Generally speaking, these systems receive requests for service in various forms (e.g., in the form of a phone call, web page form, instant message, email, etc.), and route the requests to either a virtual agent or live, human agent for addressing the request and providing an answer to the question. For example, a chat or other interactive session can be conducted between the customer or client and an automated virtual agent which guides the interaction based on a set of scripts and a knowledgebase related to the topic of the contact. In other cases, a chat session can be initiated between the customer and the live agent who can interact directly with the customer over any one or more of the available channels (e.g., web chat, instant message, email exchange, etc.).

SUMMARY OF THE INVENTION

Various embodiments including a method that uses weak supervision and co-training to help clients select data for training an automated response system in a computing environment are provided. A combination of propagation operations and learning algorithms is applied, using a selected set of labeled conversational logs retrieved from a subset of a plurality of conversational logs, to a remaining corpus of the plurality of conversational logs to train the automated response system according to an intent associated with each of the conversational logs. This applying the combination of propagation operations and learning algorithms includes (a) defining the labels by a user for the selected set of the subset of the plurality of conversational logs; (b) training a probabilistic classifier using the defined labels of features of the selected set, wherein the probabilistic classifier produces labeling decisions for the subset of conversational logs; (c) weighting the features of the selected set in a model optimization process; and/or (d) training an additional classifier using the weighted features of the selected set and applying the additional classifier to the remaining corpus.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, in contemporary customer contact centers, the systems therein provide support for customers of a particular product or service by allowing those users to make requests for service that can include a question posed by the user related to the product or service. In some cases, a chat session can be initiated between the customer or client and a live agent (e.g., a human operator) or a virtual agent (e.g., a chat bot operated by a computing system) who can interact directly with the customer over any one or more available channels (e.g., web chat, instant message, email exchange, etc.). In the case of relying more on virtual agents, often times a substantial obstacle to overcome when interacting with human customers or clients is ascertaining by the virtual agent what the underlying intent is of a query or statement posed by human customer or client.

Inherently, humans ask questions or utter statements in different semantic variances notwithstanding the intent of the question or statement in selected cases are similar. An intent in a conversational model is a concept that represents a set of semantically similar sentences for which the same response is suitable in a dialog. For example, one client may pose the question "How can I reset my internet account", while another may state "I need to reset my internet password". These questions/statements, each of which the intent would be fairly easily understood to be more or less equivalent by a human operator, may trigger a variety of responses from virtual agents. In one scenario, the virtual agent may interpret "resetting the internet account" question as a query regarding the resetting of the client's internet service in general (e.g., resetting a modem or router associated with their account), where the client's actual intent was the same as the other client requesting a password reset to get into their internet (billing) account. A vast variety of examples exist like these in which virtual agents must be trained to offer accurate results to the client when provided with utterances of such variety.

Modern chat systems recognize this limitation and attempt to create intent models by recognizing statistical classifiers trained with sample utterances. Users/administrators often create intents by collecting and annotating many sentences with their respective intents, which is a labor-intensive process. In some cases, users may cycle through hundreds if not thousands of sample utterances while still not achieving a very high intent success rate when populated into live dialog. However, the high cost involved often means that the user can afford to annotate only small example sets of utterances, resulting in further sub-optimal intent recognition performance in live dialog situations.

Accordingly, the functionality of the present invention proposes techniques to drastically reduce the labor required in annotating (labeling) available utterances provided between clients and human agents to magnify a user's input effort in mapping intent information to the utterances while additionally substantially increasing the accuracy thereof for conversational services. These techniques are particularly suited to clients who have access to an existing repository of human-to-human conversation (chat) logs. Often, those clients are the ones most ready to employ a robotic conversational service, as they have existing business needs and request handling processes to interact with their end clients. In this way, the existing repository of conversational logs may offer a way for these clients to leverage their domain knowledge and their existing chat log corpus to define user intents with which they can quickly build up a robotic service.

In some embodiments described herein and assuming that a client has access to a large collection of chat logs recording human-to-human or human-to-bot transactions, a search service is employed that allows the user to retrieve examples of the relevant sentences covering the semantic scope of an intent they desire to build. Taking a small set of utterances labeled by the user as either positive or negative examples, a sequence of propagation operations and machine learning algorithms are applied that train one another in turn to leverage the labeled examples to build a much larger set of representatives for the intent to cover a larger range of linguistic variability.

The method gives a user an easy way to define an intent in a dialog. The search-and-click labeling tool described herein provides an interface for the user to outline the semantic scope of the intent with the repository of domain knowledge. A propagation and learning pipeline makes effective use of this labeling effort by generalizing these labels to close semantic neighbors among the other utterances in the corpus, and multiple learning algorithms applied in different stages allow for different types of linguistic variability to be taken into account. Offered within a chat-bot or other interactive dialog hosting service, these mechanisms provide quick, efficient, and accurate training allowing a user to convert a human agent operated conversational service (otherwise referred to herein as an "automated response system" or "live dialog system") to one that is handled virtually.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
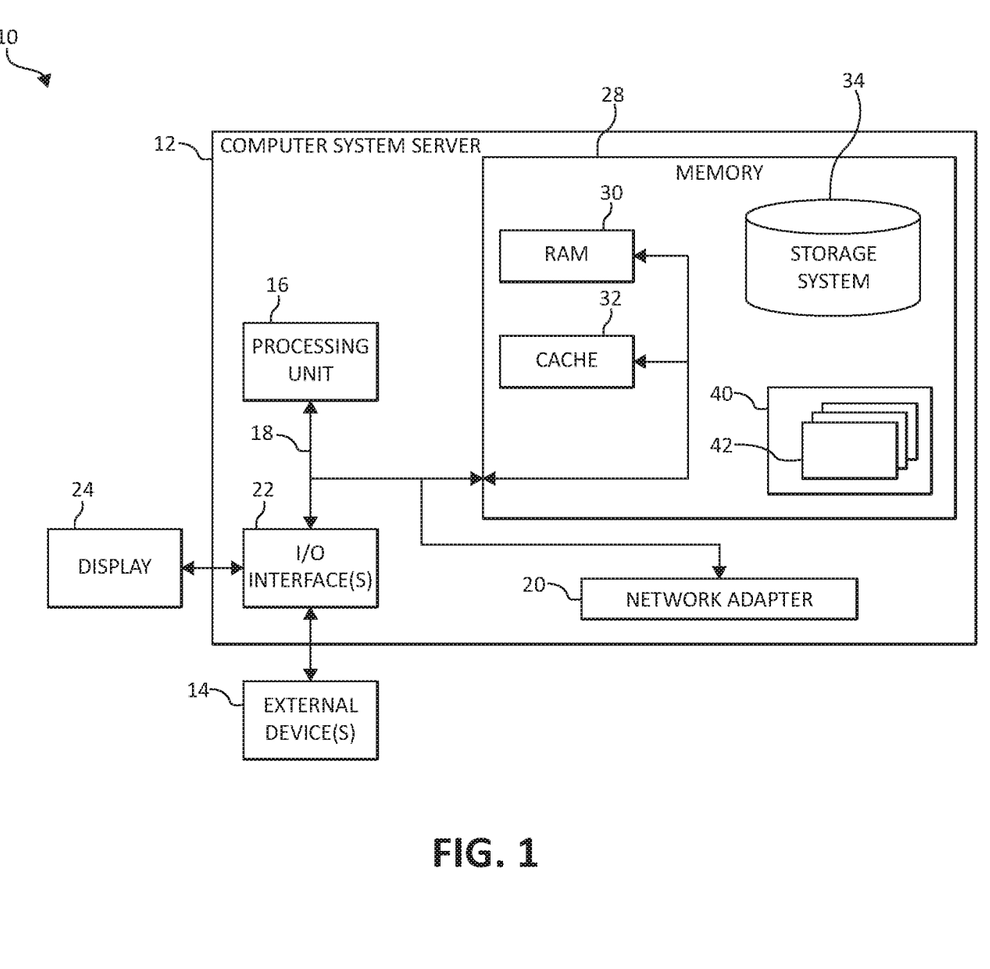
FIG. 1 is a block diagram depicting an exemplary computing node, according to embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
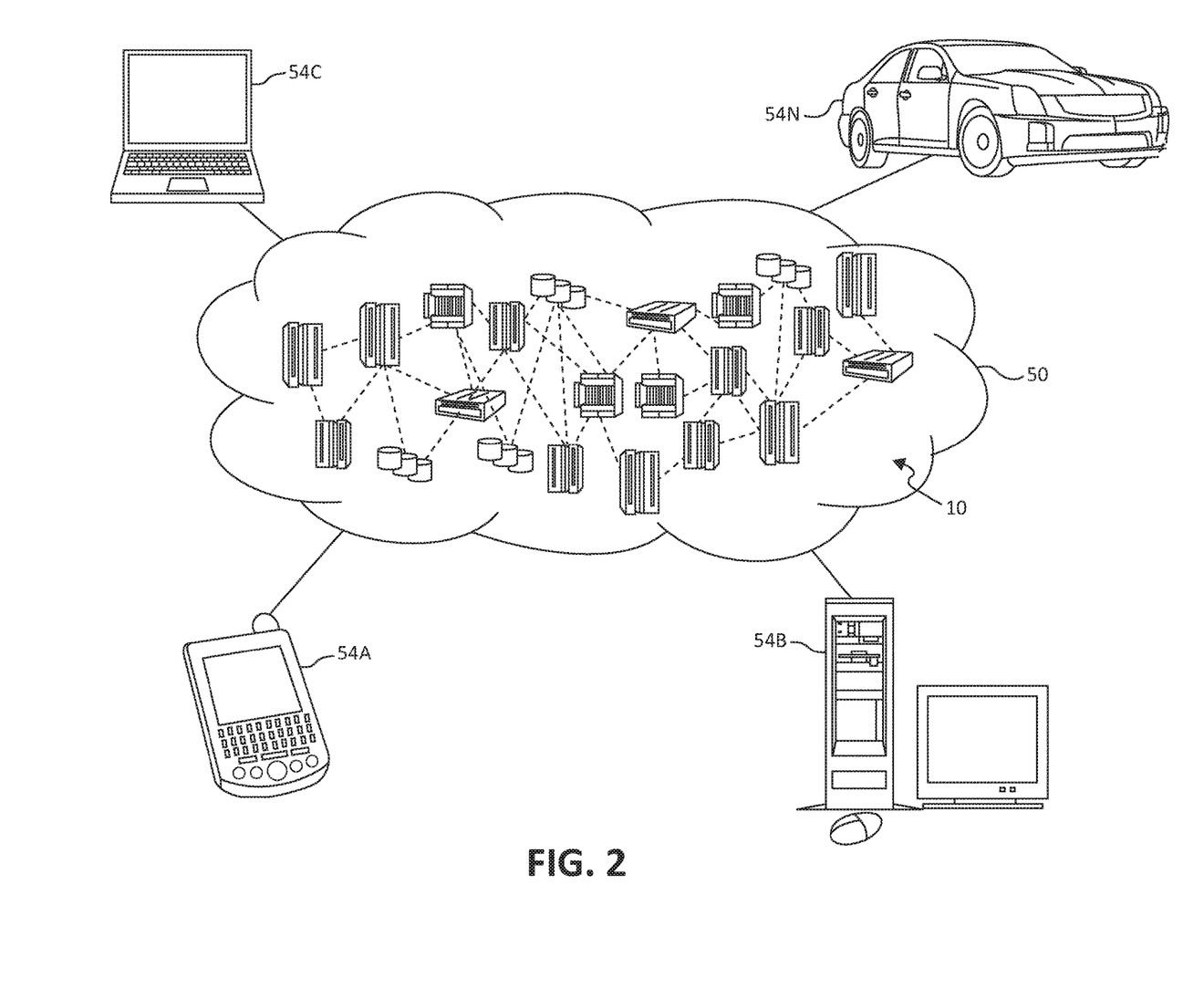
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
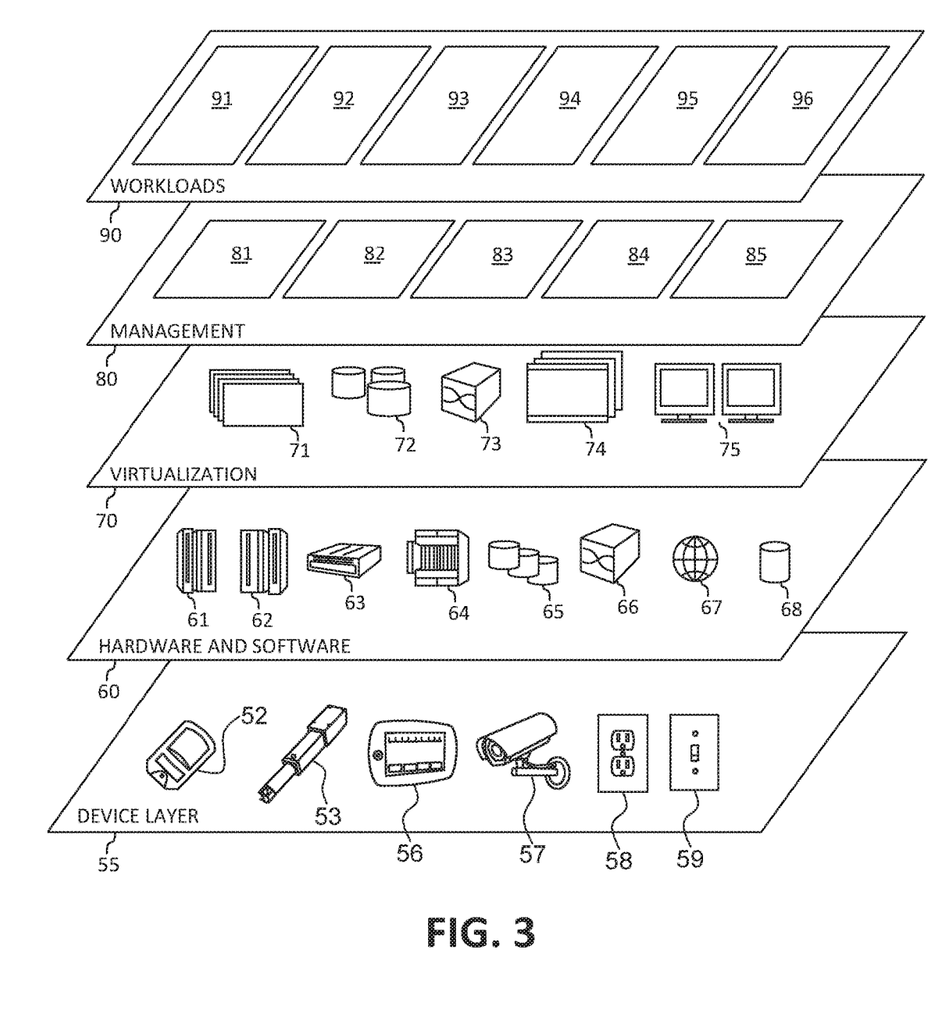
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various conversational and dialog analyzing functions 96. One of ordinary skill in the art will appreciate that the conversational and dialog analyzing functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
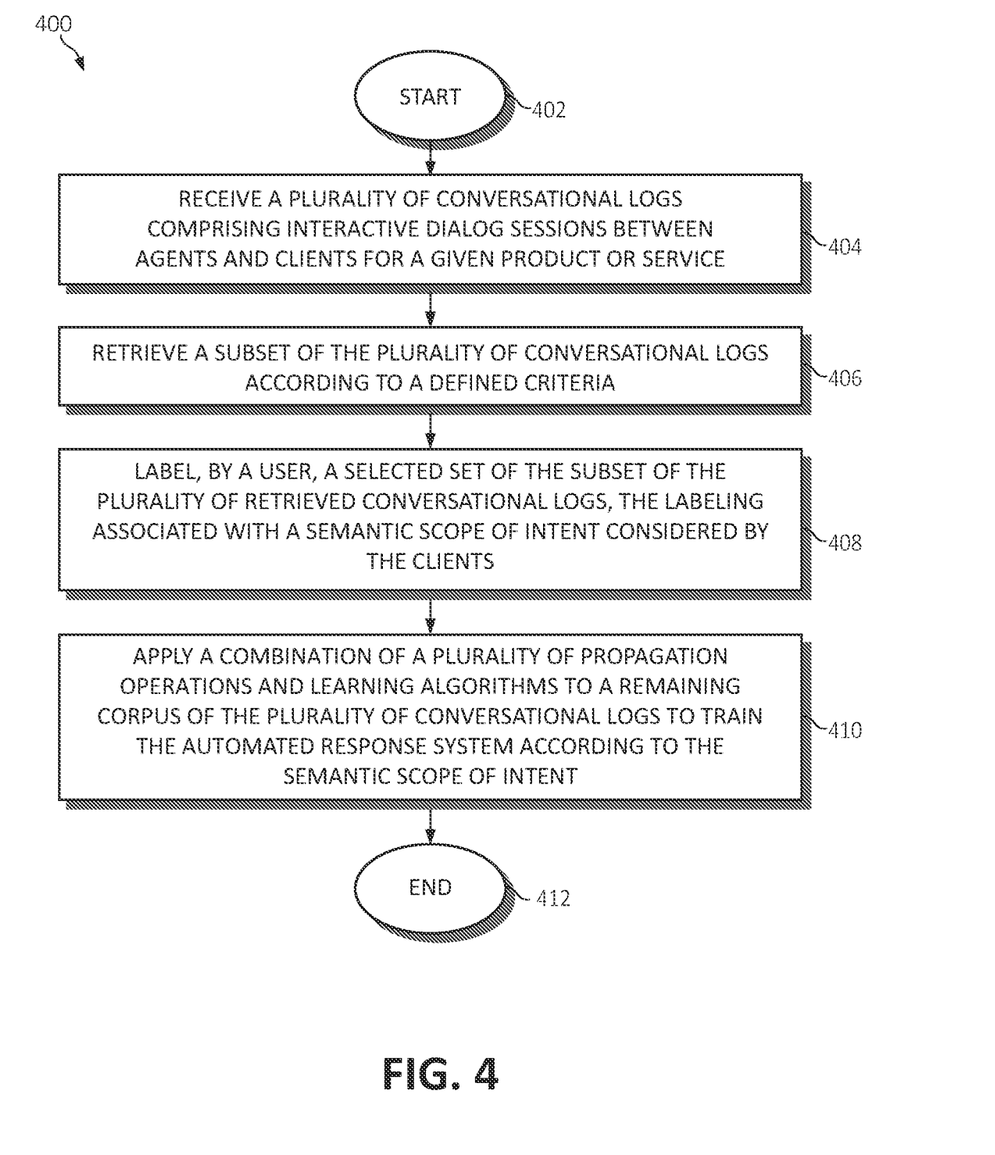
FIG. 4 is a flow chart diagram depicting a method for training an automated response system using weak supervision and co-training, according to embodiments of the present invention.

Turning now to FIG. 4, a method 400 for training an automated response system using weak supervision and co-training by a processor is depicted, in which various aspects of the illustrated embodiments may be implemented. The functionality 400 may be implemented as a method executed as instructions on a machine, where the instructions are embodied on a tangible, non-transitory machine-readable storage medium. The functionality 400 may start in block 402. In some embodiments, a plurality of conversational logs comprising interactive dialog sessions between agents and clients for a given product or service are received from a repository of stored conversational logs (step 404). A subset of the plurality of conversational logs are retrieved according to a defined criteria (step 406), and a selected set of the subset of the plurality of retrieved conversational logs are labeled by a user (step 408). The labeling is associated with a semantic scope of intent considered by the clients. A combination of propagation operations and learning algorithms using the selected set of labeled conversational logs are applied to a remaining corpus of the plurality of conversational logs to train the automated response system (i.e., the automated conversational service or live dialog system) according to the semantic scope of intent (step 410). The method 400 ends (step 412).

In accordance with aspects of the present invention, several functional components are considered. A first component includes a user interface for a user to ingest an existing conversation corpus (i.e., received from a data repository of previously saved conversational logs), by file upload or online data transfer from a human-operated chat platform. A second component includes a search service for the user to query for utterances in the corpus that are relevant to a given intent. A third component includes a labeling tool for the user to indicate whether each of a selected set of retrieved utterances is in the intent or not. A fourth component includes an ensemble of propagation operations and machine learning algorithms applied jointly (parallelly) or sequentially to leverage the user-provided labels to add utterances from the rest of the corpus to represent the intent. Finally, a fifth component optionally includes a component for suggesting alternative queries to the user (i.e., presented within a user interface (UI) to the user) who may then choose to launch one or more of additional queries to retrieve other relevant sentences from the corpus.

Figure 5:
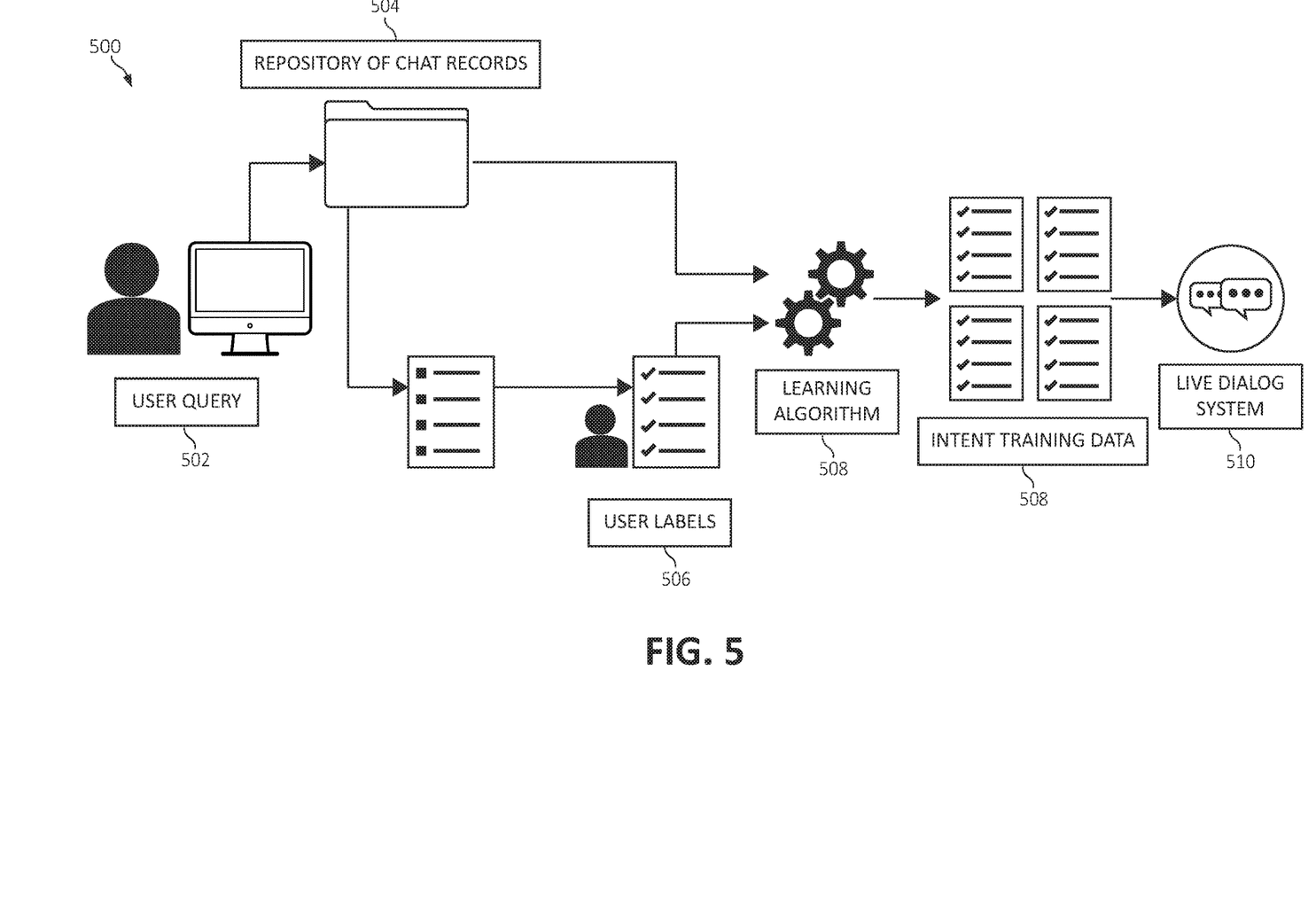
FIG. 5 is a block diagram depicting a system overview of a content authoring tool, according to embodiments of the present invention.

Referring now to FIG. 5 a system overview of a content authoring tool 500 is depicted. As shown, the various functions, or "modules" of functionality, hardware devices, and/or other components in the same descriptive sense as has been previously described in FIGS. 1-3 may be included in FIG. 5. For example, processing unit 16 and memory 28 of FIG. 1 may be employed in FIG. 5 to perform various computational, data processing, storage and other functionality in accordance with various aspects of the present invention.

The content authoring tool 500 includes a UI (described supra) to receive a user query 502 to search the corpus of conversational logs received from the repository 504 of previously conducted interactive dialog sessions (chat logs) between human operators and human clients. The content authoring tool 500 retrieves a subset of the conversational logs and presents a selected set of this subset to the user. The user then inputs user labels 506 for each utterance of each of the selected set of conversational logs such that the user affirms (inputs a positive response) or denies (inputs a negative response) whether each of these utterances is directed toward the specific intent of the user query. Various learning algorithms 508 then propagate these labels from the selected set of the subset of conversational logs to the remaining subset of conversational logs of similar utterances. Once the labels are propagated to the subset of conversational logs, the learning algorithms in the collection 508 then use them for mutual training by applying the trained algorithms jointly or sequentially upon the rest of the conversational log corpus. A final set of intent training data is then used to train a classifier for a live automated response or live dialog system 510 (i.e., a conversational system using live dialog) to accurately predict the intent of the utterances specified by the clients currently interacting with the platform, and therefore provide virtual responses commensurate with the predicted intent.

Figure 6:
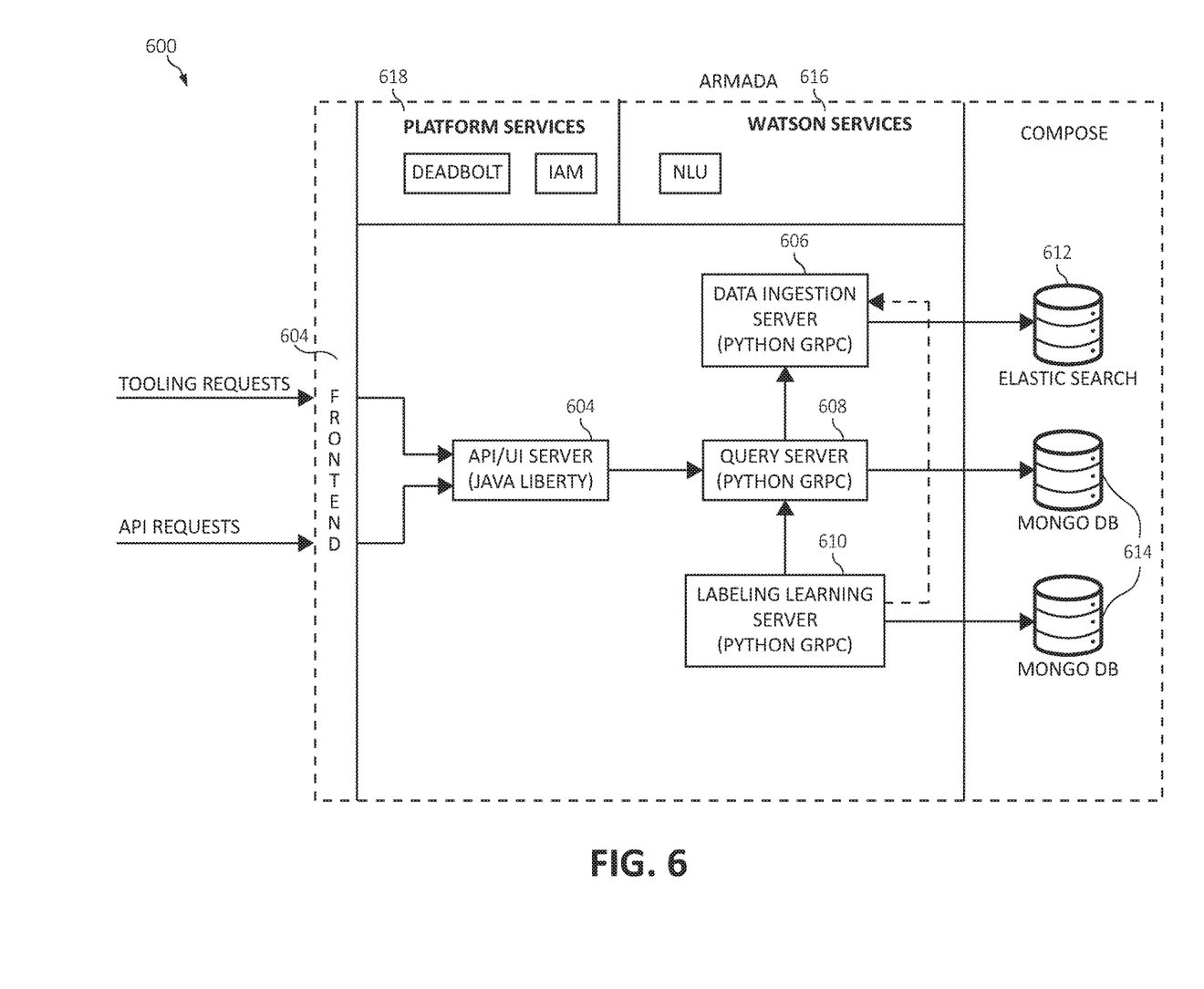
FIG. 6 is a block diagram depicting a system architecture implementing the content authoring tool, according to embodiments of the present invention.

Continuing, FIG. 6 is a block diagram depicting a system architecture 600 for implementing the content authoring tool 500, according to embodiments of the present invention. In an exemplary embodiment, the architecture 600 is implemented within the context of the IBM™ Watson™ platform and includes a frontend 602 for receiving user tooling and application programming interface (API) requests into an API/UI application server 604 (which may execute a WebSphere™ Liberty for Java™ profile). The application server 604 may communicate and exchange data regarding the conversational logs with a data ingestion server 606 for receiving and loading the corpus from the repository 504. The user may issue a query to a query server 608 (through an API executing on the application server 604) to return utterances to the UI having a specific (queried) intent, and the query server 608 may communicate with the data ingestion server 606 using an Elasticsearch search engine 612 to perform the query on a database 614 (which may comprise a MongoDB™) associated with the stored conversational logs to return the utterances. Upon returning a subset of the conversational logs and labeling a selected set of the utterances therein functioning within the context of the labeling learning server 610, the labeling learning server 610 may pass propagated labels and machine learning model data to the data ingestion server 606 for further analyzation on the remaining corpus. Additionally illustrated in the architecture 600 are administrative services including Watson services 616 (which may comprise natural language understanding (NLU) or other functionality) and platform services 618 (which may comprise Deadbolt or identity and access management (IAM) or other functionality).

Figure 7:
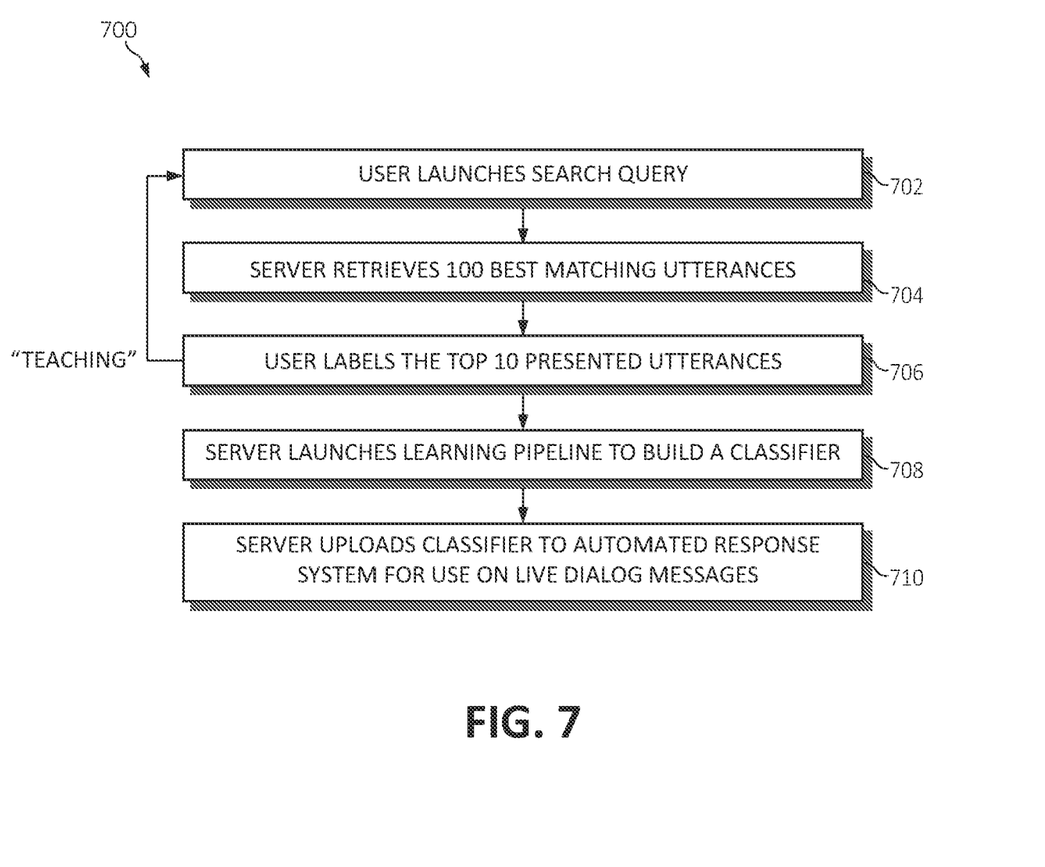
FIG. 7 is a flow chart diagram depicting a high level view of the method for training the automated response system using the learning pipeline, according to embodiments of the present invention.

FIG. 7 is a flow chart diagram depicting a method 700 for training the automated response or live dialog system 510 using a learning pipeline that includes weak supervision and co-training. The functionality 700 may be implemented as a method executed as instructions on a machine, where the instructions are embodied on a tangible, non-transitory machine-readable storage medium. At step 702, the user launches a search query into the system UI to retrieve utterances related to a semantic scope of intent input by the user, and the server (i.e., the query server 608) retrieves a set of utterances within determined conversational logs initially identified to be similar to the semantic scope of intent input by the user (step 704). For example, the user may issue a query related to the intent "teaching" and the server may retrieve and return the 100 best matching utterances initially believed to be relevant to the "teaching" semantic scope of intent. The user then is presented or identifies a selected subset of the matching utterances retrieved by the server and manually labels the top N (e.g., the top 10 best matching) presented utterances (step 706). This label information may then be propagated to additional utterances and/or the user may be presented (via the UI) with suggestive alternative queries which may retrieve other relevant utterances related thereto. The method 700 may then return to step 702 where the user launches additional queries using the suggestive intent information to retrieve additional relevant results. Returning to step 704, the server then may, as aforementioned, propagate the user's label information regarding the utterances to the remaining subset of the retrieved utterances of the conversational logs, and subsequently launch a learning pipeline to build a probabilistic classifier to estimate intent probabilities for the larger (remaining set) of the corpus (step 708). Upon training the machine learning model with the correct intent information associated with the remaining corpus, the server may then upload this trained classifier to a live dialog server (e.g., Watson) for use on a live automated response or live dialog system 510 associated therewith (step 710).

In some aspects, the propagation operations comprise simple decision rules that define an equivalent set of sentences (utterances) from the conversational logs which propagate or assign the same label provided by the user to a seed set of examples from the subset to the remaining subset of utterances. The machine learning algorithms, on the other hand, use a mathematical model to generalize the label assignments. It should be noted that, as contextually referred to herein, the difference between propagation operations and learning algorithms are only in the complexity of the decision models or rules involved, which may vary according to implementation.

An example of a propagation operation may comprise, for each search query, the top N (e.g., N=100) returned results (utterances) being taken as an equivalent set. A selected subset of size M (e.g., M=10) utterances thereof are then presented to the user; and if the user labels over a fraction (e.g., ½) of the presented sentences or utterances as positive, a positive label will be propagated to the entire set of N utterances.

Another example of a propagation operation may comprise, for each sentence or utterance, computing its relative semantic neighborhood in the corpus using a chosen featurization method and a suitable similarity measure (e.g., term frequency-inverse document frequency (TF-IDF) vectorization and cosine similarity). For each utterance receiving a label either from the user or from a prior-stage classification, the label may be applied to all its semantic neighbors (e.g., utterances having a cosine similarity of 0.99 or higher to the labeled utterance).

Machine learning algorithms suitable in this context may comprise any statistical classifier trainable with a small number of seed utterances with user-provided or auto-propagated labels. In one aspect, the machine learning based models may be performed using a wide variety of methods or combinations of methods, such as supervised learning, unsupervised learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, and fuzzy clustering. Specific details regarding any of the examples of supervised, unsupervised, reinforcement learning, or other machine learning described in this paragraph are known and are considered to be within the scope of this disclosure.

In some embodiments, and as aforementioned, an ensemble of propagation and learning steps may leverage multiple views of the corpus of conversational logs. When arranged in parallel (e.g., where simple generalization rules are applied to multiple search queries independently), the corpus may be projected to different views each defined by a query, and labels may be generalized according to each view. When arranged in sequence, the generalization results from one step can be used to train the next step. That is, the output model of one propagation and/or learning operation may be used as input to a next propagation and/or learning operation. Thus, the subset of (seed) utterances may be used to initially train a small portion of the model, which then iterates over itself using various different propagation operations and/or learning algorithms to accurately develop the model using the remaining corpus.

For example, the propagated labels for the per-query equivalent sets of utterances may be used to train a probabilistic classifier where the per-query labels for each utterance are considered measurements (or, in machine learning terminology, "features"). Weights on the features may then be learned in a model optimization process. The classifier produces labeling decisions and estimates of the posterior probabilities for a larger set of utterances (e.g., all those retrieved by at least one user query). Those utterances decided with high probability for being either positive or negative relative to the input semantic scope of intent may then be used to train another classifier, such as a support vector machine. The support vector machine may use another set of features unrelated to those used in previous steps (e.g., using a different learning model), and may be applied to the rest of the corpus. The joint use of multiple rules or learning algorithms may therefore yield a labeled set of utterances from the corpus of conversational logs which is much larger than the set explicitly labeled by the user. The resultant examples can be used to train an intent classifier to be used in live dialog on the automated response or interactive live dialog system 510.

Figure 8:
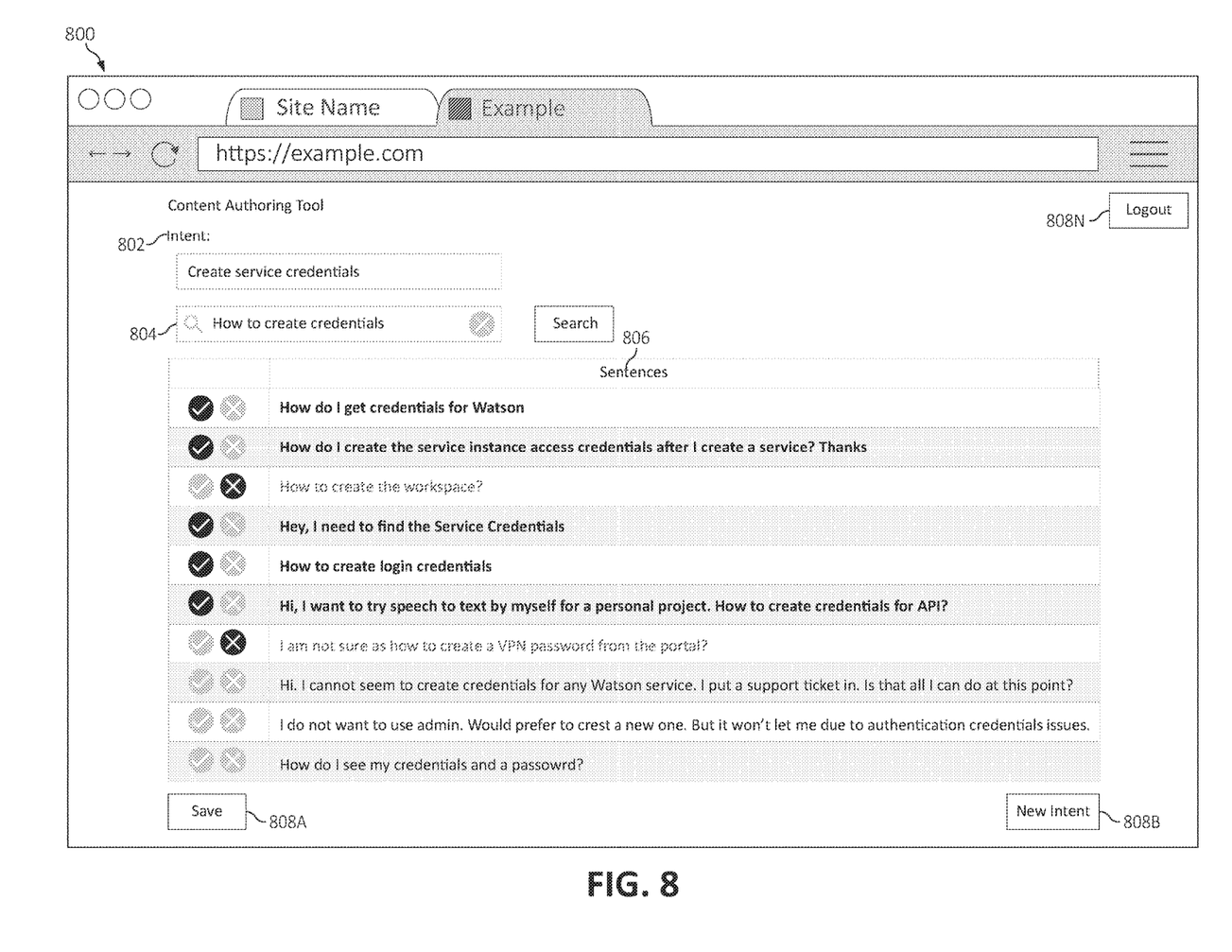
FIG. 8 is a block diagram depicting a user interface implementing the content authoring tool, according to embodiments of the present invention.

Referring now to FIG. 8, a block diagram depicting a user interface (UI) 800 implementing the content authoring tool 500 is illustrated. The UI 800 may be presented in graphical form such as a graphical user interface (GUI) having an intent input field 802 for input of the semantic scope of intent (e.g., "create service credentials") which is currently under consideration, a user query field 804 (e.g., "how to create credentials"), and various administrative function buttons or inputs 808A-n, which may include a "save" button 808A for save functionality, a "new intent" button 808B to create a new semantic scope of intent, and a "logout" button 808n to logout of the system. Of course, the administrative function buttons or inputs 808A-n exemplified in UI 800 may be rearranged, renamed, or comprise only a small portion of the many various administrative input functions used in an actual implementation.

The UI 800 may additionally include a conversation window 806 which displays the resulting utterances retrieved from the user query performed by inputting information into the user query field 804. The conversation window 806 may additionally comprise functionality to allow the user to affirm or deny whether each retrieved utterance is related to the semantic scope of intent input in to the intent field 802. In the depicted embodiment, to the left side of each utterance within the conversation window 806 is a check box (i.e., for positively indicating through input by the user that the given utterance is associated with the input intent) and an "X" box (i.e., for negatively indicating through input by the user that the given utterance is not associated with the input intent). In this fashion, the depicted check box and "X" box is used for ease in administration of the intent authoring system so as to allow many utterances to be "scored" in a minimal amount of time. In other embodiments, however, various techniques may be considered for scoring the utterances. For example, in one embodiment, a scoring system including a numerical range from 1-5 may be used to associate how closely related the given utterance is to the currently considered input intent. Many alternative forms for scoring each utterance relative to the input intent may be used without limitation, as one of ordinary skill in the art would appreciate.

Figure 9:
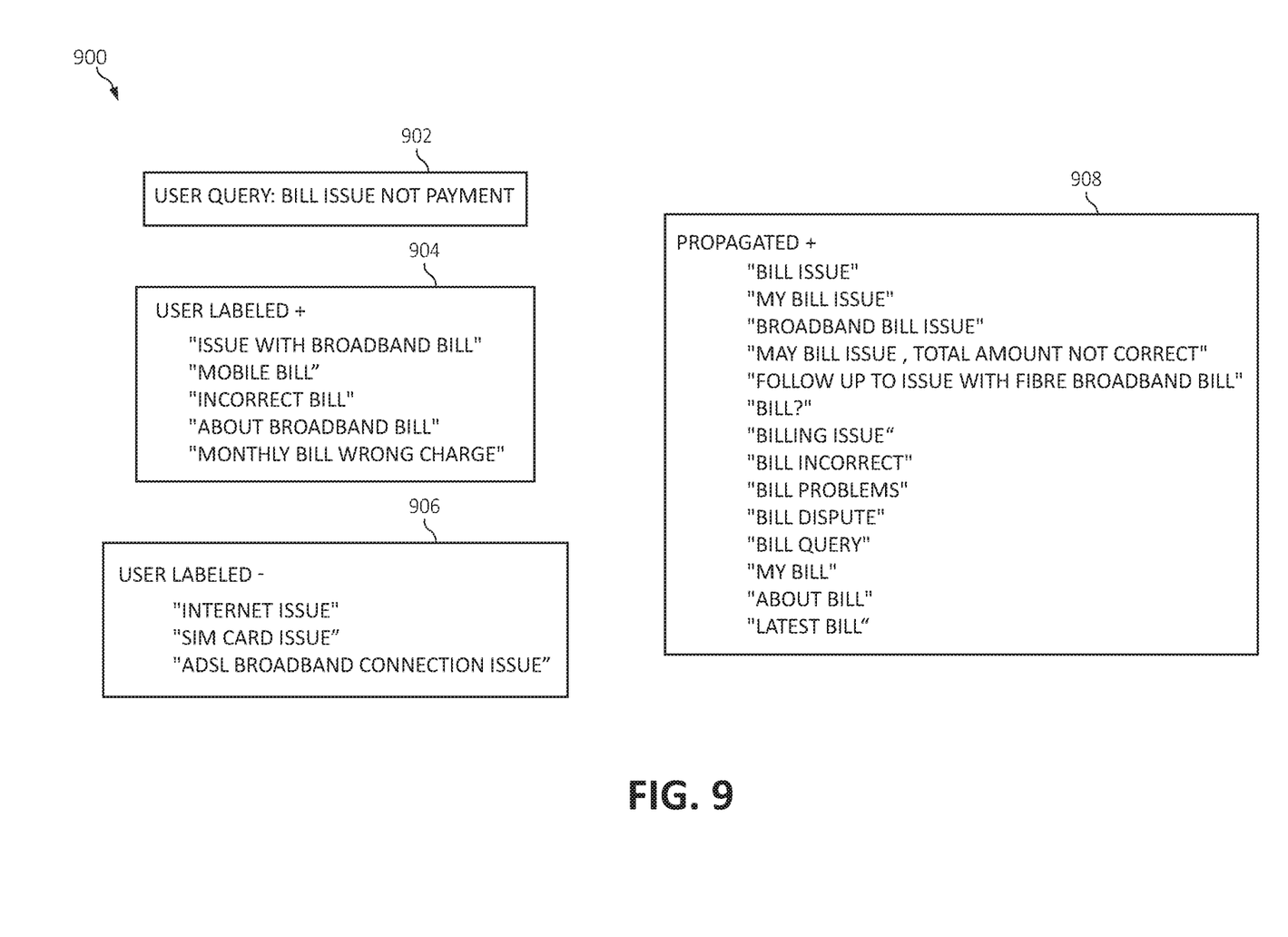
FIG. 9 is a block diagram depicting a propagation example when implementing the content authoring tool, according to embodiments of the present invention.

Referencing now FIG. 9, a block diagram depicting a propagation example 900 when implementing the content authoring tool 500 is illustrated. The propagation example 900 illustrates the utterances propagated from the remaining corpus of conversational logs upon the user scoring a selected set of a subset of retrieved utterances. For example, for the user query 902 "bill issue NOT payment", the system returned a number N set (e.g., 10) of retrieved utterances from the conversational logs believed to be relevant to the given semantic scope of intent provided by the user. The user then labeled a first portion 904 (a selected set) of the number N set of retrieved utterances as positively associated with the intent (e.g., "issue with broadband bill", "mobile bill", etc.) and a second portion 906 of the number N set of retrieved utterances as negatively (not) associated with the intent ("internet issue", "sim card issue", etc.). Using the user-defined labels created for the respective utterances positively associated with the intent (i.e., the first portion 904), the system propagated this information using defined rules and classifications to assign a positively identified label (positively associated with the defined intent) to a remaining retrieved portion 908 of the corpus. These positively labeled utterances (of the first portion 904 and the remaining retrieved portion 908) are then used as input to additional classifiers associated with a plurality of learning algorithms (applied parallelly or sequentially) to accurately label the remaining entirety of the corpus of conversational logs according to the scope of the intent.

Again, it should be noted that one classifier or learning algorithm model may be used as input to another (alternative) classifier or learning model, hence this is a co-training process. Accordingly, the functionality of the present invention requires the user to label only a selected sample of utterances retrieved pursuant to an intent search query, wherein the system then propagates these label responses and trains additional classifiers and/or learning models independently, automatically, and iteratively. The training data may contain noise due to imperfect automatic labeling, hence the process involves only weak supervision. This model, which is unique to each conversational log corpus, may then be implemented in a particular clients automated response or live dialog system 510 to virtually respond to customer/client queries and/or inputs.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for training an automated response system using weak supervision and co-training, by a processor, comprising:
   applying a combination of propagation operations and learning algorithms, using a selected set of labeled conversational logs retrieved from a subset of a plurality of conversational logs, to a remaining corpus of the plurality of conversational logs to train the automated response system according to an intent associated with each of the conversational logs, wherein applying the combination of propagation operations and learning algorithms comprises:
   defining the labels by a user for the selected set of the subset of the plurality of conversational logs;
   training a probabilistic classifier using the defined labels of features of the selected set, wherein the probabilistic classifier produces labeling decisions for the subset of conversational logs;
   weighting the features of the selected set in a model optimization process; and
   training an additional classifier using the weighted features of the selected set and applying the additional classifier to the remaining corpus.

2. The method of claim 1, wherein the subset of the plurality of conversational logs is returned in response to an input query by the user requesting to retrieve the subset of the plurality of conversational logs according to a defined criterion; and
   the defined criterion comprises one or more utterances relevant to the intent input by the user during the input query.

3. The method of claim 2, wherein the combination of propagation operations and learning algorithms are applied in parallel to the remaining corpus.

4. The method of claim 2, wherein the combination of propagation operations and learning algorithms are applied sequentially to the remaining corpus such that an output of a first operation is used to train an input of a second operation performed on the remaining corpus.

5. The method of claim 2, further including, in response to the input query by the user, presenting to the user suggested alternative queries to retrieve other utterances within the remaining corpus of the plurality of conversational logs relevant to the intent.

6. The method of claim 1, wherein the labeling further includes displaying the selected set of the subset of conversational logs on a user interface (UI) and receiving user input indicating affirmatively or negatively whether each of the selected set of the subset of conversational logs is relevant to the intent.

7. The method of claim 1, wherein the plurality of conversational logs are received from a historical repository of previously saved interactive dialog sessions.

8. A system for training automated response systems using weak supervision and co-training, comprising:
   a processor executing instructions stored in a memory device; wherein the processor:
   applies a combination of propagation operations and learning algorithms, using a selected set of labeled conversational logs retrieved from a subset of a plurality of conversational logs, to a remaining corpus of the plurality of conversational logs to train the automated response system according to an intent associated with each of the conversational logs, wherein applying the combination of propagation operations and learning algorithms comprises:
   defining the labels by a user for the selected set of the subset of the plurality of conversational logs;
   training a probabilistic classifier using the defined labels of features of the selected set, wherein the probabilistic classifier produces labeling decisions for the subset of conversational logs;
   weighting the features of the selected set in a model optimization process; and
   training an additional classifier using the weighted features of the selected set and applying the additional classifier to the remaining corpus.

9. The system of claim 8, wherein the subset of the plurality of conversational logs is returned in response to an input query by the user requesting to retrieve the subset of the plurality of conversational logs according to a defined criterion; and the defined criterion comprises one or more utterances relevant to the intent input by the user during the input query.

10. The system of claim 9, wherein the combination of propagation operations and learning algorithms are applied in parallel to the remaining corpus.

11. The system of claim 9, wherein the combination of propagation operations and learning algorithms are applied sequentially to the remaining corpus such that an output of a first operation is used to train an input of a second operation performed on the remaining corpus.

12. The system of claim 9, wherein the processor, in response to the input query by the user, presents to the user suggested alternative queries to retrieve other utterances within the remaining corpus of the plurality of conversational logs relevant to the intent.

13. The system of claim 8, wherein the labeling further includes displaying the selected set of the subset of conversational logs on a user interface (UI) and receiving user input indicating affirmatively or negatively whether each of the selected set of the subset of conversational logs is relevant to the intent.

14. The system of claim 8, wherein the plurality of conversational logs are received from a historical repository of previously saved interactive dialog sessions.

15. A computer program product for training automated response systems using weak supervision and co-training, by a processor, the computer program product embodied on a non-transitory computer-readable storage medium having computer-readable program code portions stored therein, the computer-readable program code portions comprising:

an executable portion that applies a combination of propagation operations and learning algorithms, using a selected set of labeled conversational logs retrieved from a subset of a plurality of conversational logs, to a remaining corpus of the plurality of conversational logs to train the automated response system according to an intent associated with each of the conversational logs, wherein applying the combination of propagation operations and learning algorithms comprises:

defining the labels by a user for the selected set of the subset of the plurality of conversational logs;

training a probabilistic classifier using the defined labels of features of the selected set, wherein the probabilistic classifier produces labeling decisions for the subset of conversational logs;

weighting the features of the selected set in a model optimization process; and training an additional classifier using the weighted features of the selected set and applying the additional classifier to the remaining corpus.

16. The computer program product of claim 15, wherein the subset of the plurality of conversational logs is returned in response to an input query by the user requesting to retrieve the subset of the plurality of conversational logs according to a defined criterion; and the defined criterion comprises one or more utterances relevant to the intent input by the user during the input query.

17. The computer program product of claim 16, wherein the combination of propagation operations and learning algorithms are applied in parallel to the remaining corpus.

18. The computer program product of claim 16, wherein the combination of propagation operations and learning algorithms are applied sequentially to the remaining corpus such that an output of a first operation is used to train an input of a second operation performed on the remaining corpus.

19. The computer program product of claim 16, further including an executable portion that, in response to the input query by the user, presents to the user suggested alternative queries to retrieve other utterances within the remaining corpus of the plurality of conversational logs relevant to the intent.

20. The computer program product of claim 15, wherein the labeling further includes displaying the selected set of the subset of conversational logs on a user interface (UI) and receiving user input indicating affirmatively or negatively whether each of the selected set of the subset of conversational logs is relevant to the intent.

21. The computer program product of claim 15, wherein the plurality of conversational logs are received from a historical repository of previously saved interactive dialog sessions.

* * * * *